United States Patent [19]

Miele

[11] Patent Number: 4,570,894
[45] Date of Patent: Feb. 18, 1986

[54] UMBRELLA HOLDER FOR GOLF CART

[76] Inventor: Angelo M. Miele, 72 W. Main St., Rahway, N.J. 07065

[21] Appl. No.: 637,906

[22] Filed: Aug. 6, 1984

[51] Int. Cl.⁴ .............................................. A47G 25/12
[52] U.S. Cl. .................................... 248/534; 248/230; 248/205.2; 248/284; 224/274; 224/918; 224/919
[58] Field of Search ............... 248/534, 539, 514, 230, 248/284, 286, 205.2, 359 F; 224/274, 918, 919; 280/DIG. 5, DIG. 6

[56] References Cited

U.S. PATENT DOCUMENTS

| | | | |
|---|---|---|---|
| 1,162,608 | 12/1915 | Hohl et al. | 248/514 |
| 2,496,478 | 2/1950 | Kinnebrew | 248/230 |
| 2,806,711 | 9/1957 | Jacobs . | |
| 2,822,143 | 2/1958 | Johansen | 248/514 X |
| 2,918,297 | 12/1959 | Peters . | |
| 2,960,263 | 11/1960 | Goddard | 248/230 X |
| 3,304,035 | 2/1967 | Davis | 248/514 X |
| 3,304,036 | 2/1967 | Davis | 248/286 X |
| 3,602,466 | 8/1971 | Drowns | 248/514 |
| 3,866,934 | 2/1975 | Braun . | |
| 4,008,874 | 2/1977 | Conway, Jr. . | |
| 4,023,763 | 5/1977 | Pulley | 248/284 X |
| 4,334,692 | 6/1982 | Lynch . | |

FOREIGN PATENT DOCUMENTS

| | | | |
|---|---|---|---|
| 977938 | 12/1964 | United Kingdom | 248/205.2 |
| 1502414 | 3/1978 | United Kingdom . | |

OTHER PUBLICATIONS

KinBag Corp., "KinBag-The Compact, Lightweight, Elegant Golf Bag with the Built-In Cart!".

Primary Examiner—Ramon S. Britts
Assistant Examiner—Karen Chotkowski
Attorney, Agent, or Firm—Lerner, David, Littenberg, Krumholz & Mentlik

[57] ABSTRACT

An umbrella holder for a golf cart is adapted to hold a handle of an umbrella when the umbrella is open and to hold a collapsed canopy portion of the umbrella when the umbrella is closed. The holder is also adapted for infinite adjustment between a first elevation and a second elevation, whereby the umbrella can be set at many different heights. By making the holder pivotable, the angle of inclination of the umbrella can be varied.

7 Claims, 3 Drawing Figures

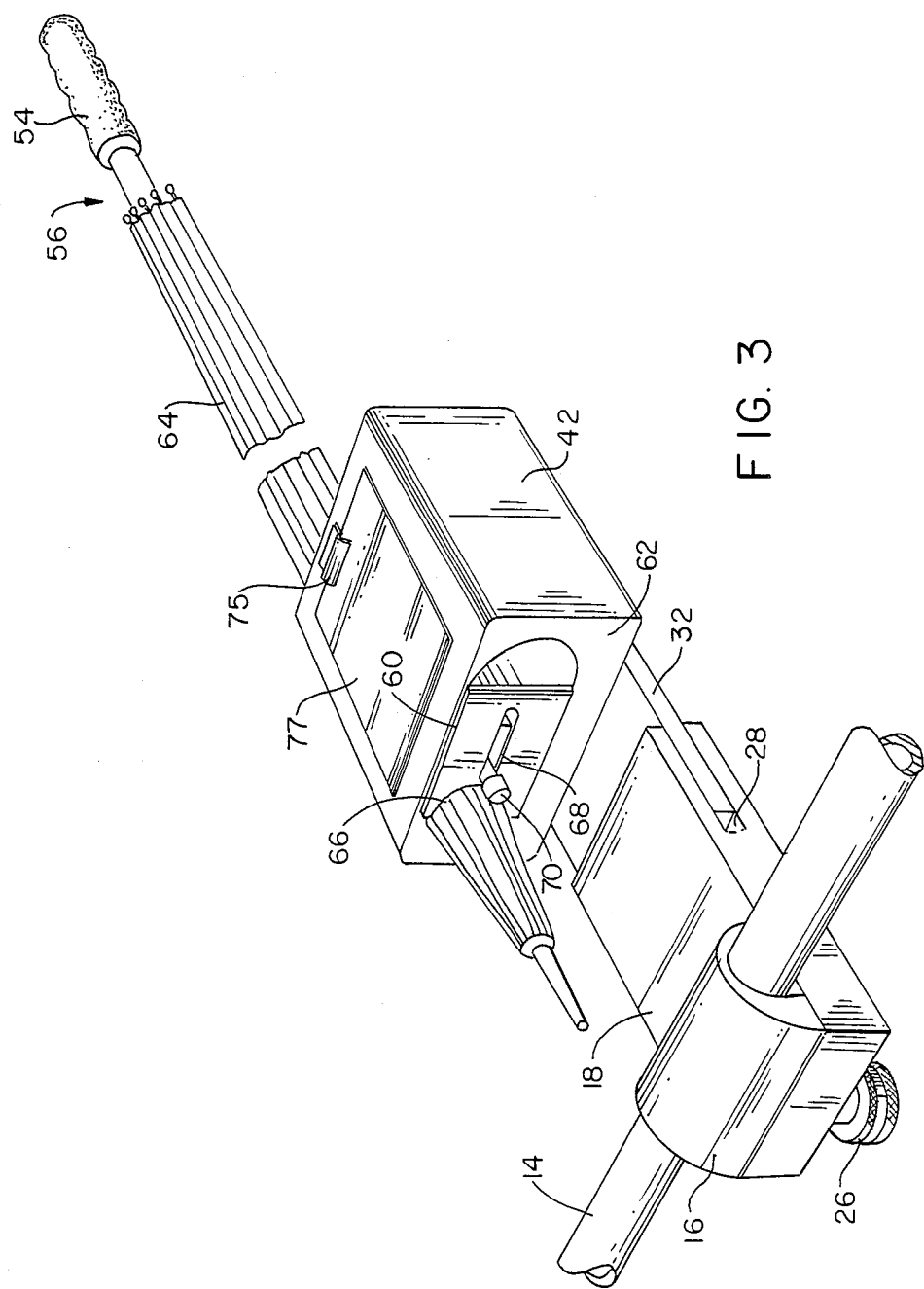
FIG. 3
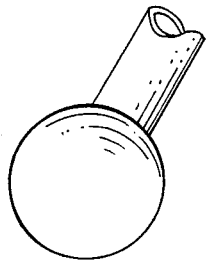

UMBRELLA HOLDER FOR GOLF CART

FIELD OF THE INVENTION

The present invention relates to an umbrella holder for a golf cart, and, more particularly, to such a holder which is adapted for attachment to a hand-pulled golf cart or the like.

BACKGROUND OF THE INVENTION

Typically, large multi-colored golf umbrellas are strapped onto a golf bag, whether the bag is being carried by a golfer or some type of golf cart. In order to use the umbrella, the golfer must hold the umbrella in one hand and carry the bag or pull the golf cart with the other hand. When making a shot, the golfer must put the umbrella down on the ground, thereby exposing the golfer and the equipment in the golf bag to the rain. Also, when the umbrella is on the ground, a gust of wind can blow the umbrella away from the golfer.

One attempt to avoid the above-described problems involves providing a pull-type golf cart with a built-in umbrella holder which is large enough to store a closed golf umbrella (see U.S. Pat. No. 3,866,934). In use, the golf umbrella is removed from the holder and mounted thereon in various different positions. Because the holder is provided as original equipment on the golf cart, the complexity and hence the manufacturing costs of the cart are increased. Moreover, the holder is not suitable for retrofitting onto existing golf carts.

British Pat. No. 1,052,414 discloses, in one embodiment (see FIGS. 7 and 8), an umbrella holder which is adapted to be releasably clamped to a handle of a pull-type golf cart. The holder includes a tubular socket adapted to receive the handle of an open golf umbrella, no provision beng made for holding the umbrella when it is closed. Although the height of the socket relative to the handle of the golf cart can be adjusted, the adjustability of the holder is limited to three specific elevations. Also, the angle of inclination of the socket and hence the umbrella can be adjusted.

SUMMARY OF THE PRESENT INVENTION

The present invention relates to a new and improved umbrella holder for a golf cart, such as a hand-pulled golf cart or the like. In accordance with one improvement, the umbrella holder not only holds a handle of an umbrella when the umbrella is open but also holds a collapsed canopy portion of the umbrella when the umbrella is closed. More particularly, the holder can be adjusted between a first position in which the umbrella is automatically maintained in a substantially vertical orientation when the umbrella is open and a second position in which the umbrella is automatically maintained in a substantially horizontal orientation when the umbrella is closed. Thus, a golfer can walk underneath the umbrella as he or she pulls the golf cart. If the golfer wants to hit a shot, the umbrella can be left in the holder, wind conditions permitting. In windy conditions, the golfer, before hitting a shot, can close the umbrella and store it in the holder to prevent the umbrella from being blown away.

In accordance with another improvement, the height of the holder is infinitely adjustable between a first elevation and a second elevation. This improvement allows the umbrella to be set at many different heights so that the umbrella can be adjusted to accommodate individuals of various different heights. The holder is also pivotable such that the angle of inclination of the umbrella can be varied.

Yet another improvement involves equipping the holder such that score cards, golf tees and golf balls can be stored therein. Clips can be provided for a score card and a golf towel. The holder can also be provided with a fastener for fastening a golf glove to the holder.

BRIEF DESCRIPTION OF THE DRAWINGS

For a better understanding of the present invention, reference is made to the following detailed description of an exemplary embodiment considered in conjunction with the accompanying drawings, in which:

FIG. 3 is a perspective view of the umbrella holder illustrated in FIG. 1, the holder being shown in a position adapted to receive a closed umbrella and to maintain it in a substantially horizontal orientation.

DETAILED DESCRIPTION OF THE EXEMPLARY EMBODIMENT

Figure 1:
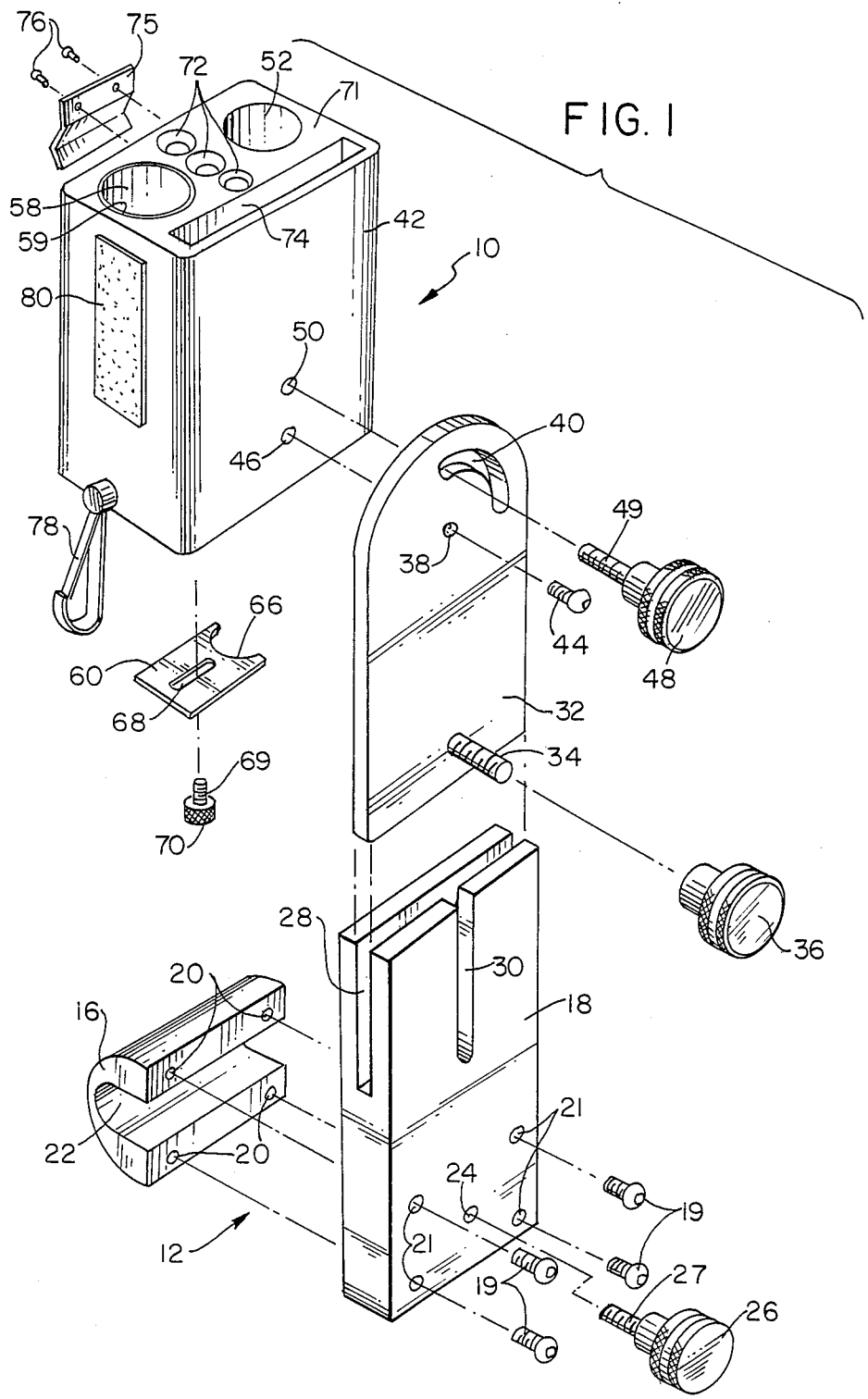
FIG. 1 is an exploded view of an exemplary embodiment of an umbrella holder constructed in accordance with the present invention.
Figure 2:
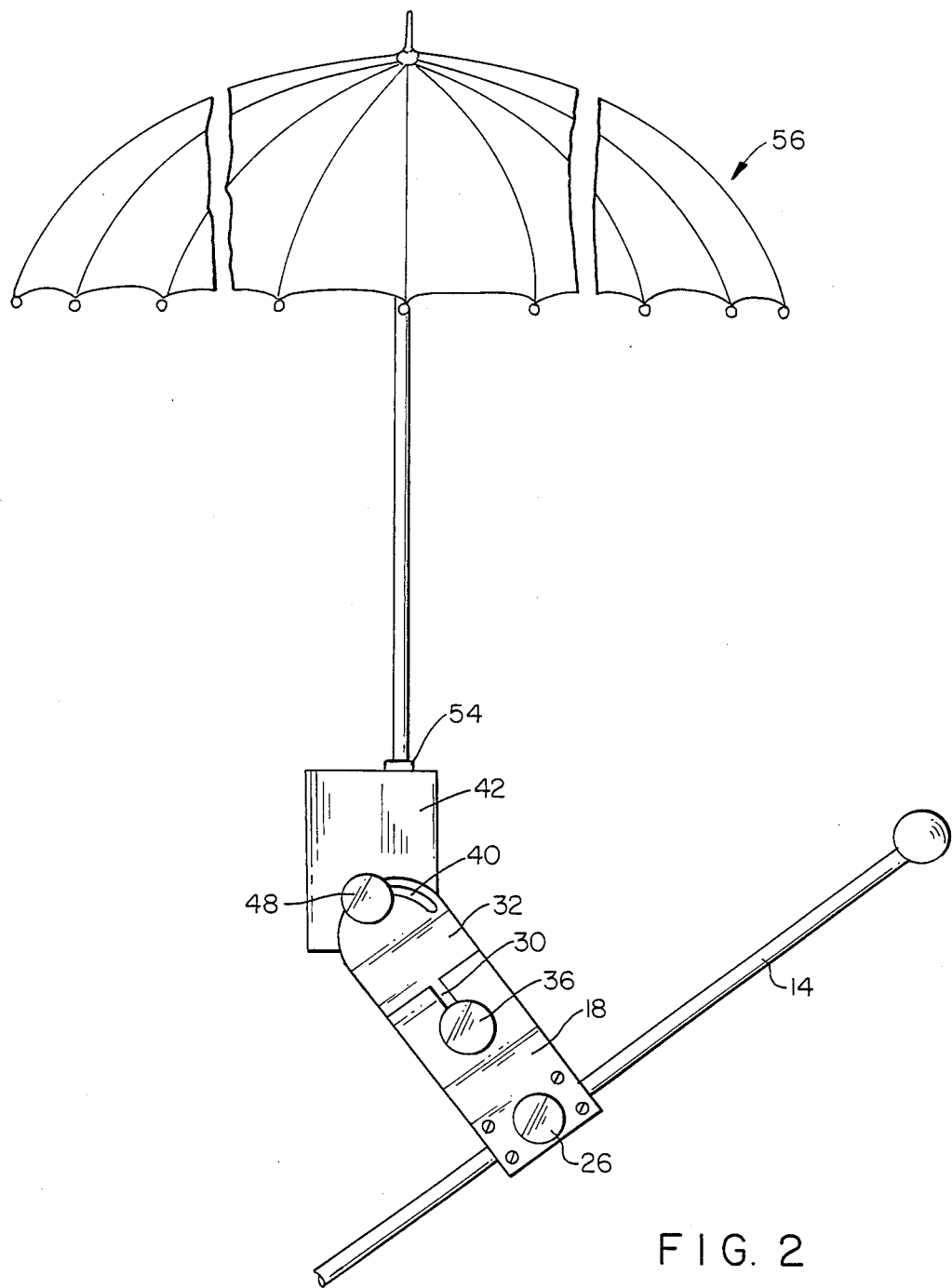
FIG. 2 is a perspective view of the umbrella holder illustrated in FIG. 1, the holder being shown in a position adapted to receive an open umbrella and to maintain it in a substantially vertical orientation.

Referring to FIGS. 1-3, there is shown an umbrella holder 10 which includes a clamp 12 for releasably and adjustably clamping the holder 10 to a golf cart handle 14 (see FIGS. 2 and 3). The clamp 12 includes a first clamp member 16 and a second clamp member 18. The clamp member 16 is secured to the clamp member 18 by screws 19, which are threadedly received in internally threaded holes 20 in the clamp member 16 after passing through holes 21 in the clamp member 18. The clamp member 16 is also provided with a channel 22 sized and shaped such that the clamp 12 can be slid along the golf cart handle 14. An internally threaded hole 24 in the clamp member 18 communicates with the channel 22 in the clamp member 16. A fastener 26 has an externally threaded shank 27, which is threadedly received in the hole 24. The shank 27 is long enough to extend through the clamp member 18 and into the channel 22 in the clamp member 16, where it can engage the golf cart handle 14 in order to lock the clamp 12 and hence the holder 10 in place on the golf cart handle 14. The clamp member 18 is also provided with a groove 28 and a slot 30, which communicates with the groove 28.

A height adjustment plate 32 is slidably received in the groove 28 of the clamp member 18. The height adjustment plate 32 carries an externally threaded pin 34, which extends outwardly from the clamp member 18 through the slot 30. A fastener 36 is internally threaded such that it can be threadedly received on the pin 34. By tightening the fastener 36 against the clamp member 18, the height adjustment plate 32 can be fixedly positioned relative to the clamp member 18. The height adjustment plate 32 also includes a hole 38 and an arcuate slot 40.

A support block 42 is pivotally attached to the height adjustment plate 32 by a screw 44, which passes through the hole 38 in the height adjustment plate 32 and which is threadedly received in an internally threaded hole 46 in the support block 42. A fastener 48 has an externally threaded shank 49, which extends through the arcuate slot 40 and is threadedly received in another internally threaded hole 50 in the support block 42. By tightening the fastener 48 against the height adjustment plate 32, the angular position of the support block 42 relative to the height adjustment plate 32 can be fixed.

The support block 42 also includes a first bore 52, which is sized and shaped so as to receive a handle 54 of a full-sized golf umbrella 56 (see FIG. 2), and a second bore 58, which is sized and shaped so as to receive one or more golf balls (not shown). A resilient O-ring 59 permits golf balls to be inserted into the bore 58, while preventing them from inadvertently falling out of the bore 58. A stop plate 60 is slidably mounted on a bottom surface 62 of the support block 42 such that the stop plate 60 can be moved to a position in which it obstructs the bore 52 to thereby engage the handle 54 of the golf umbrella 56 (see FIG. 2) or to a position in which it clears the bore 52 to thereby permit a collapsed canopy portion 64 of the umbrella 56 to extend through the bore 52 (see FIG. 3). A semi-circular cutout 66 in the stop plate 60 facilitates the passage of the collapsed canopy portion 64 of the umbrella 56. The stop plate 60 is also provided with a slot 68 sized and shaped so as to permit an externally threaded shank 69 of a fastener 70 to extend through the stop plate 60 and threadedly engage an internally threaded hole (not shown) in the bottom surface 62 of the support block 42. The stop plate 60, which normally obstructs the bore 58 to prevent golf balls from falling out of the bore 58, can be moved to a position in which it clears the bore 58 to permit golf balls to be dispensed from the bore 58. The position of the stop plate 60 can be adjusted by loosening the fastener 70, moving the stop plate 60 and then retightening the fastener 70.

A top surface 71 of the support block 42 is provided with three countersunk holes 72 adapted to releasably receive golf tees (not shown) and a pocket 74 adapted to store miscellaneous items, such as score cards, pencils, etc. (not shown). A clip 75 (see FIGS. 1 and 2) is attached by screws 76 to the support block 42 for holding a score card 77 (see FIG. 3). Another clip 78 on the support block 42 is for a golf towel, while a strip of Velcro 80 is also provided on the support block 42 for releasably engaging a Velcro fastener of a golf glove (not shown).

In order to hold the golf umbrella 56 in an open position, the holder 10 is positioned as shown in FIG. 2. With the holder 10 in such a position, the handle 54 of the umbrella 56 can be inserted into the bore 52 of the support block 42 until the handle 54 engages the stop plate 60, which has been positioned so as to obstruct the bore 52. In such a position, a golfer can walk underneath the umbrella 56 as he or she pulls the golf cart by the handle 14. In order to accommodate individuals of various different heights, the height of the umbrella 56 can be adjusted by loosening the fastener 36, raising or lowering the height adjustment plate 32 relative to the clamp member 18 and then retightening the fastener 36. Further height adjustments can be made by loosening the fastener 26, moving the clamp 12 up or down the golf cart handle 14 and then retightening the fastener 26. The angle of inclination of the umbrella 56 can be adjusted by loosening the fastener 48, pivoting the support block 42 relative to the height adjustment plate 32 and then retightening the fastener 48. The angle of inclination of the umbrella 56 can also be varied by loosening the fastener 26, rotating the clamp 12 about the golf cart handle 14 and then retightening the fastener 26.

In order to store the umbrella 56 when it is closed, the fastener 26 is loosened and the holder 10 is rotated about the golf cart handle 14 to the position illustrated in FIG. 3. After retightening the fastener 26, the stop plate 60 is moved from underneath the bore 52 so as to permit the closed canopy portion 64 of the umbrella 56 to extend through the bore 52. Thus, in windy conditions, the golfer, before hitting a shot, can close the umbrella 56 and store it in the holder 10 to prevent the umbrella 56 from being blown away.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.

I claim:

1. In combination, an umbrella, said umbrella including a shaft, a handle located at one end of said shaft and a canopy portion located at an opposite end of said shaft and movable between an open position, in which said canopy portion extends generally radially outward from said shaft, and a closed position, in which said canopy portion is collapsed against said shaft; and an umbrella holder, said umbrella holder including attaching means for releasably and adjustably attaching said holder to a handle of a golf cart such that said holder is adjustable between a first position, in which said umbrella is maintained in a substantially vertical orientation when said canopy portion of said umbrella is in its open position, and a second position, in which said umbrella is maintained in a substantially horizontal orientation transversely of the handle of the golf cart when said canopy portion of said umbrella is in its closed position, and holding means for removably holding said handle of said umbrella when said canopy portion is in its open position and for removably holding said canopy portion of said umbrella when said canopy portion is in its closed position, said holding means having a bore extending therethrough defining a first open end located on one face of said holder and a second open end located on an opposite face of said holder, a stop for lateral movement with respect to said bore and located has been included following the term "mounted"; mounted on said one face of said holder, said stop being movable between an extended position, in which said first open end of said holding means is obstructed by said stop so as to engage said handle of said umbrella when said canopy portion of said umbrella is in its open position and said handle of said umbrella is inserted into said bore from said second open end, and a retracted position, in which said first open end of said holding means is not obstructed by said stop so as to permit said canopy portion of said umbrella to extend beyond said one face of said holder when said canopy portion is in its closed position and is inserted through said bore said umbrella holder including storing means for storing golf balls, said storing means including another bore which extends through said umbrella holder from said one face thereof to said opposite face thereof, said stop being movable to positions for obstructing and not obstructing said another bore to control the dispensing of golf balls from said storing means.

2. The combination of claim 1, wherein said stop includes a plate slidably mounted on said one face of said umbrella holder.

3. The combination of claim 1, wherein said umbrella holder further includes adjusting means for adjusting the height of said holding means relative to said attaching means such that the height of said holding means is infinitely adjustable between a first elevation and a second elevation.

4. The combination of claim 1, wheren said umbrella holder further includes pivoting means for pivoting said holding means relative to said attaching means, whereby the position of said holding means relative to said handle of said golf cart can be varied independently of said attaching means.

5. The combination of claim 1, wherein said umbrella holder further includes first storing means for storing score cards, second storing means for storing golf tees and third storing means for storing golf balls.

6. The combination of claim 5, wherein said umbrella holder further includes fastening means for releaseably fastening a golf glove to said umbrella holder.

7. The combination of claim 6, wherein said umbrella holder further includes first clipping means for clipping a golf towel to said umbrella holder and second clipping means for clipping a score card to said umbrella holder.

* * * * *

UNITED STATES PATENT AND TRADEMARK OFFICE
CERTIFICATE OF CORRECTION

PATENT NO. : 4,570,894

DATED : February 18, 1986

INVENTOR(S) : A. Miele

It is certified that error appears in the above-identified patent and that said Letters Patent is hereby corrected as shown below:

Column 4, line 47, after "stop", insert --mounted--.

Column 4, lines 49 and 50, delete "has been included following the term "mounted"; mounted".

Column 4, line 61, after "bore", insert --,--.

Signed and Sealed this

Tenth Day of June 1986

[SEAL]

Attest:

DONALD J. QUIGG

Attesting Officer

Commissioner of Patents and Trademarks